US007579793B2

(12) United States Patent
Fischer

(10) Patent No.: US 7,579,793 B2
(45) Date of Patent: Aug. 25, 2009

(54) SYSTEM AND METHOD FOR EFFICIENT WIDE DYNAMIC RANGE COIL DRIVE

(75) Inventor: James C. Fischer, Fountain Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 315 days.

(21) Appl. No.: 11/674,931

(22) Filed: Feb. 14, 2007

(65) Prior Publication Data

US 2008/0191649 A1 Aug. 14, 2008

(51) Int. Cl.
*H02K 33/12* (2006.01)

(52) U.S. Cl. ....................... 318/135; 318/687; 318/671; 318/592; 310/12; 310/13; 310/14; 310/15; 310/17; 310/36; 74/126; 74/128; 267/136; 267/137; 267/140.11; 267/140.5

(58) Field of Classification Search .................. 310/12, 310/13, 14, 15, 17, 36; 318/135, 592, 687, 318/671; 267/136, 137, 140.5, 140.11; 74/126, 74/128; 104/30
See application file for complete search history.

(56) References Cited

U.S. PATENT DOCUMENTS

| | | | | |
|---|---|---|---|---|
| 4,165,791 | A * | 8/1979 | Smith | 177/212 |
| 4,641,065 | A * | 2/1987 | Shibuki et al. | 318/135 |
| 4,916,632 | A * | 4/1990 | Doi et al. | 700/280 |
| 5,838,079 | A * | 11/1998 | Morohashi et al. | 310/12 |
| 5,921,134 | A * | 7/1999 | Shiba et al. | 74/110 |
| 5,955,799 | A * | 9/1999 | Amaya et al. | 310/36 |
| 6,538,720 | B2 * | 3/2003 | Galburt et al. | 355/53 |
| 2006/0119026 | A1 * | 6/2006 | Ryaboy et al. | 267/140.15 |
| 2007/0013895 | A1 * | 1/2007 | Okada | 355/72 |
| 2007/0050139 | A1 * | 3/2007 | Sidman | 701/220 |

* cited by examiner

*Primary Examiner*—Rita Leykin
(74) *Attorney, Agent, or Firm*—Ingrassia Fisher & Lorenz, P.C.

(57) ABSTRACT

Methods and systems are provided for driving one or more force coils. A system for driving force coils is provided including a PWM drive coupled to a first coil and a linear drive coupled to a second coil. The PWM drive efficiently drives the first coil to apply a first force. The linear drive drives the second coil to apply a second force that is substantially noise-free. The first force is greater than the second force.

20 Claims, 3 Drawing Sheets

40
EXTERNAL DC SUPPLY
20
14
24
26
SECONDARY +DC SUPPLY
18
22
28
SECONDARY -DC SUPPLY

100
BEGIN
105
DEFINE OPERATION PARAMETERS OF FORCE COIL DRIVE SYSTEM
110
DETERMINE OPERATION MODES BASED ON ONE OR MORE OPERATION PARAMETERS
115
SELECT FORCE COIL CONFIGURATION BASED ON ONE OR MORE OPERATION PARAMETERS
120
DETERMINE DRIVE TYPE FOR EACH PWM DRIVE AND LINEAR DRIVE
125
H-BRIDGE DRIVE SELECTED?
NO
YES
130
SELECT PWM SCHEME WHEN H-BRIDGE DRIVE IS SELECTED
135
SELECT FORCE COIL DESIGN
END

SYSTEM AND METHOD FOR EFFICIENT WIDE DYNAMIC RANGE COIL DRIVE

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract No. 02_C-5080 awarded by N.A.S.A.

FIELD OF THE INVENTION

The present invention generally relates to driving force coils and, more particularly, relates to systems and methods for driving force coils while controlling the resolution, efficiency, and noise across a wide range of force application.

BACKGROUND OF THE INVENTION

A variety of platforms (e.g., aircraft, automotive vehicles, ships, spacecraft, and buildings) have payloads (e.g., mirrors, telescopes, lasers, cameras, and other types of sensing devices) attached to them that require a vibration free environment. Active isolators have been used to provide the vibration free environment. The isolators perform four different primary functions: connecting the payload to the platform; isolating the payload from the vibrations of the platform; transferring forces from the platform to the payload to change the payload orientation or point the payload; and, transferring forces from the platform to the payload to cancel forces generated on the payload that may induce vibration of the payload.

One example of an active isolator is a passive D-strut in combination with a multistage (e.g., two force coils) actuator. The passive D-strut has a spring and a damper in parallel with the spring along the axis of control of the strut. The spring and damper connect the payload to the bus and make the isolator "soft" (e.g., moveable) along the axis of control and "stiff" (e.g., substantially rigid) in all other axes. Absent a force application (e.g., via the force coil), the spring supports the payload in a neutral position. The damper prevents the payload from being driven into oscillation at the resonance frequency of the spring. A typical force coil is an electrical coil that when energized (e.g., via a force coil drive) applies equal and opposite forces to the payload and the platform along the axis of control. The amount of force the force coil applies is proportional to the magnitude of the current running through the force coil, and the direction of the force application is generally dependent on the polarity of this current.

When using the isolator to prevent the transfer of vibration movements of the platform to the payload, the force coil is driven at a current level that creates the forces for compressing and extending the spring/damper such that the payload sees no change in the force for maintaining the payload in the neutral position. These applied forces are typically in a low force range (e.g., peak forces less than about 1 pound-force (lbf)) over a frequency range of DC to 100 Hz and have a resolution of 0.0005 lbf. These forces are desirably noise/ripple free.

When using the isolator to cancel forces applied to the payload by equipment mounted on the payload, the force coil applies an equal and opposite force to transfer the force to the platform while canceling the force on the payload thereby maintaining the payload in the neutral position. The canceling force is typically less than about 0.1 lbf over a frequency range of about 100 Hz to about 300 Hz and having a resolution of about 0.0005 lbf. This canceling force is also desirably noise/ripple free.

When using the isolator to transfer forces to re-orientate the payload, the forces are generally known and can be directly commanded. These forces are substantially greater in magnitude (e.g., up to about 100 lbf) than the previous mentioned applied forces but are associated with substantially lower frequencies (e.g., less than about 0.01 Hz). Because these forces are used to re-orientate the payload, these forces are not required to be noise/ripple free but should be efficiently generated. However, transitioning from a high-force efficient operation (e.g., for payload re-orientation) to a low force noise free operation (e.g., for canceling forces applied to the payload by equipment mounted on the payload) should be smooth to prevent applying undesirable forces that could disturb the payload and induce vibrations.

One conventional technique for applying some of these forces includes the use of a single force coil driven by a single drive, such as a linear drive or a pulse width modulated (PWM) drive. The single drive can be a single-ended or a dual-ended drive (e.g. an H-bridge drive). The single-ended drive is generally simpler to incorporate a current sense, such as by installing a precision resistor between the force coil and a ground. Additionally, the single-ended drive may be operated accurately by solely supplying a drive current to the force coil and referencing the force coil to ground to minimize common-mode offset. Most conventional drive systems are powered from a single source. Generally, the single-ended drive requires two power sources, a separate power source for each polarity of the single-ended drive, and the second power source would be created to sink and source power for the single-ended drive. The H-bridge drive may be powered from a single power source referenced to ground.

Driving with a linear drive is generally considered noise free due to the constant application of the desired voltage drop to obtain the desired output current/force. However, the linear drive is generally inefficient because, with the continuous application of the required voltage, the linear drive drops the difference between the supply voltage and the desired voltage. With the average voltage drop across the force coil being zero, the total power dissipation is the current multiplied by the supply voltage. The linear drive losses are thus the total power losses less the coil losses.

The PWM Drive applies two different voltages to the force coil over a short time period, and the percentage of time in each voltage state is controlled such that the average voltage applied over this time period substantially equals the desired average voltage over this time period. The PWM drive is generally the most efficient because the output stage of the PWM drive is being switched between two states when the output stage is in saturation. This minimizes the power dissipated in the PWM drive because the power dissipation is the force coil current multiplied by the saturation voltage. In an H-bridge PWM drive, the current flows through two separate drives of the H-bridge PWM drive at all times such that the power dissipation is twice the saturation voltage multiplied by the force coil current.

A digital control system has been used to control the force coil drive with force sensors in active struts, accelerometers on the payload, and an inertial reference sensor system on the payload as disturbance detectors to provide feedback for determining the force coil drive currents. External commands may be provided to the digital control system for repositioning. In this application, the digital control system outputs current commands to the force coil drive via 16-bit digital-to-analog (D-A) converters. Current telemetry feedback is also provided via 16-bit analog-to-digital (A-D) converters. More commonly, 12-bit D-A converters and A-D converters are used for such applications. To control the force coils to adequately output forces for the foregoing operations, the force coils should operate over a range of about −100 lbf to about +100 lbf and with a resolution of about 0.0005 lbf. Dividing the full range (e.g., 200 lbf) by the resolution (e.g., 0.0005 lbf) produces 400,000 increments or just under 23-bits of resolution. The 16-bit D-A of the digital control system has 32,768 bits of resolution.

Accordingly, it is desirable to provide a method and system for driving one or more force coils that may be used with an isolator. More particularly, it is desirable to provide a method and system for efficiently driving one or more force coils over a wide range with higher resolution than presently obtainable. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Systems and methods are provided for efficiently driving one or more force coils to produce output forces over a wide range with higher resolution than obtainable with conventional force coil drive systems. In an exemplary embodiment, a system for driving force coils is provided comprising a pulse width modulation (PWM) drive having an output for coupling to a first coil of the force coils, and a linear drive having an output for coupling to a second coil of the force coils. The PWM drive is configured to drive the first coil to apply a first force, and the linear drive is configured to drive the second coil to apply a second force. The first force is greater than the second force, and the second force has low noise. More particularly, the PWM drive produces a first current signal that drives the first coil to efficiently produce high output forces, and the linear drive produces a second current signal that drives the second coil to produce low output forces with a predetermined resolution.

In another exemplary embodiment, a system for driving force coils is provided comprising first and second force coils, a PWM drive having an output coupled to the first force coil, and a linear drive having an output coupled to the second force coil. The PWM drive is configured to drive the first force coil to apply a first force, and the linear drive is configured to drive the second coil to apply a second force. The first force is greater than the second force, and the second force has low noise.

In another exemplary embodiment, a method for manufacturing a force coil drive system having a PWM drive and a linear drive is provided comprising defining operation parameters of the force coil drive system, determining modes of operation based on one or more of the operation parameters, selecting a force coil configuration based on one or more of the operation parameters, determining a drive type for each of the PWM drive and the linear drive, selecting a PWM scheme when an H-bridge drive is selected, and selecting a force coil design.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
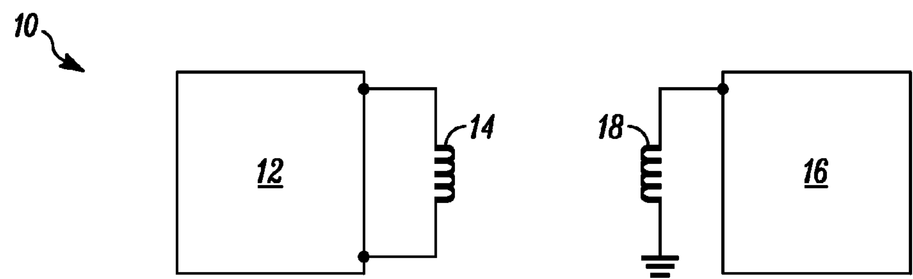
FIG. 1 is a block diagram of a force coil drive system in accordance with an exemplary embodiment of the present invention.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention is a system and method for driving one or more force coils. More particularly, the present invention is a system and method for driving one or more force coils to produce output forces over a wide range (e.g., from about +100 lbf to about −100 lbf) with a higher resolution (e.g., about 0.0005 lbf) than currently obtainable from a single coil driven by a single driver. In one exemplary embodiment, the system and method for driving one or more force coils operates efficiently and has minimal noise/ripple over a lower force range (e.g., from about +1.0 lbf to about −1.0 lbf).

Generally, the system comprises a pulse width modulated (PWM) drive for driving at least one of the force coils to efficiently produce high forces (e.g., from about +100 lbf to about −100 lbf with a resolution of about 0.006 lbf), and a linear drive for driving at least one of the force coils to produce low level, high resolution, noise/ripple free forces (e.g., from about +2.0 lbf to about −2.0 lbf with a resolution of about 0.0001 lbf). With the present invention, the PWM drive may be operated to drive the force coil(s) for maximum efficiency at high force levels. For low level, substantially noiseless force applications, the PWM drive can be deactivated while the linear drive provides such forces with minimum noise. In some configurations, the drives can be operated simultaneously with the linear drive canceling ripple torques produced by the operation of the PWM drive.

The combination of the PWM drive and the linear drive has three operational modes. During a first mode (Mode-1), the PWM drive is activated for maximum driving efficiency of the system. When operating in Mode-1 with the linear drive disabled or deactivated, active drive output stage devices of the PWM drive are "off" and fly-back diodes associated with the PWM drive carry the load current until the load current decays to zero. In an alternative embodiment, the linear drive remains active for a duration to force the current command to zero, thereby minimizing transients when the linear drive is reactivated.

During a second mode (Mode-2), both drives are activated to drive with minimum noise/ripple when the force levels are greater than the capability of the linear drive. When operating in Mode-2 and deactivating the PWM drive, active drive output stage devices of the PWM drive are “off” and the fly-back diodes associated with the PWM drive carry the load current until the load current decays to zero. In an alternative embodiment with the PWM drive configured as an H-bridge PWM drive, the H-bridge PWM drive may be controlled to operate in a state such that the force coil is effectively shorted causing the force coil current to slowly decay to zero. This alternative embodiment is useful in the event the back-emf voltage of the force coil(s), during Mode-2, is insufficient to cause current to flow after decaying to zero. During a third mode (Mode-3), the linear drive is activated and the PWM drive is deactivated for a lowest noise/ripple operation.

Each of the linear drive and PWM drive may have a variety of configurations including, but not necessarily limited to, single-ended and H-bridge. During operation, a single-ended PWM drive has two operating states: a positive supply across the force coil; and, a negative supply across the force coil. The single-ended PWM drive has a single PWM scheme that switches between the two supply voltages to obtain the desired average voltage. An H-bridge PWM drive has four operating states: the supply voltage is coupled to the positive end of the force coil and the negative end is coupled to ground in a first state; both ends of the force coil are coupled to ground in a second state; the supply voltage is coupled to the negative end for the force coil and the positive end is coupled to ground in a third state; and, both ends of the force coil are coupled to the supply voltage in a fourth state. Both the second state and the fourth state apply approximately zero volts across the force coil. Several potential modulation schemes are available with four different states. In a first modulation scheme, a two-state scheme, the PWM drive switches between the first state and the third state. In a second modulation scheme, a three-state scheme, the PWM drive switches between the first state and the second state or switches between the second state and the third state. The PWM drive 12 can operate in either the two-state scheme or the three-state scheme and operate in any of the three operating modes (e.g., Mode-1, Mode-2, or Mode-3).

Referring now to the drawings, FIG. 1 is a block diagram of a force coil drive system 10 in accordance with an exemplary embodiment of the present invention. The drive system 10 comprises an efficient PWM drive 12, a coarse force coil 14 coupled to the PWM drive 12, a linear drive 16, and a fine force coil 18 coupled to the linear drive 16. In this exemplary embodiment, the coarse force coil 14 is electrically and magnetically isolated from the fine force coil 18. The PWM drive 12 efficiently drives the coarse force coil 14 to produce relatively high forces (e.g., about ±100 lbf), while the linear drive 16 drives the fine force coil 18 to produce relatively noise/ripple-free low forces (e.g., about ±1 lbf). The coarse force coil 14 is configured for producing the relatively high forces, and the fine force coil 18 is configured for producing the relatively noise/ripple-free low forces. The force coil drive system 10 is highly versatile because each force coil 14, 18 can be tuned for a particular performance. Additionally, each of the drives 12, 16 can be a different drive type (e.g., one single-ended and the other an H-bridge, both single-ended, or both H-bridges), and the drives 12, 16 can be powered from different supplies.

In one exemplary embodiment, with both drives 12, 16 configured as H-bridge drives, the drive system 10 can be operated between Mode-3 (e.g., with PWM drive 12 deactivated for minimum noise/ripple) and Mode-2 (e.g., with both drives 12, 16 activated for high force operation), and use either method for disabling the PWM drive 12 or the linear drive 16 (e.g., all active devices of the H-bridge drive being “off” or the active devices of the lower output stages of the H-bridge drive being “on”). For example, the active devices of the lower output stages of the PWM drive 12 are “on” when the PWM drive 12 is deactivated to produce a zero current condition during three-state operation of the PWM drive 12, and the current gradually decays to zero. When the active devices of all output stages of PWM drive 12 are “off,” the current more rapidly decreases to zero.

Figure 2:
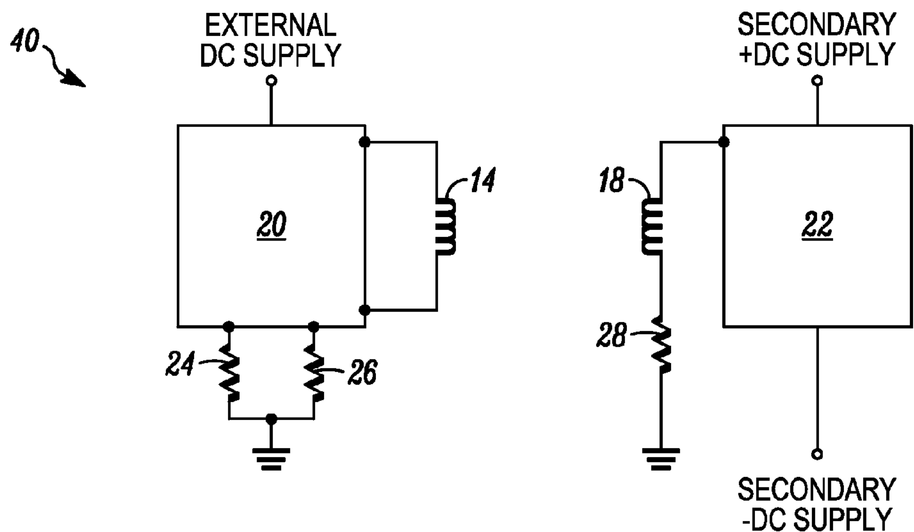
FIG. 2 is a block diagram of a force coil drive system having an H-bridge PWM Drive and a single-ended linear drive in accordance with another exemplary embodiment of the present invention.

FIG. 2 is a block diagram of a force coil drive system 40 having an H-bridge PWM drive and a single-ended linear drive 22 in accordance with another exemplary embodiment of the present invention. The force coil drive system 40 comprises an H-bridge PWM drive 20 powered by an external power supply and ground, the coarse force coil 14 coupled to the H-bridge PWM drive 20, a single-ended linear drive 22, and the fine force coil 18. The linear drive 22 is identified as single-ended with one end of the fine force coil 18 coupled to ground through a current sense resistor 28 with the linear drive 22 powered by two opposite polarity supplies (e.g., a secondary +DC supply and a secondary −DC supply). Force coil drive system 40 additionally comprises current sense resistors 24, 26 each having one terminal coupled to the H-bridge PWM drive 20 and the other terminal grounded.

The H-bridge PWM drive 20 can couple each end of the coarse force coil 14 to either the external DC supply or ground. Additionally, the H-bridge PWM drive 20 receives control logic driving the H-bridge PWM drive 20 that assures that current is sourced or returned at one end of the coarse force coil 14, at the other end of the coarse force coil 14, or at both ends at all times so that the load current is sensed by measuring the voltage drop across one of the current sense resistors 24, 26. The measured current can be used as a feedback to control the duty-cycle of the H-bridge PWM drive 20. The single-ended linear drive 22 operates between a positive and negative supply (e.g., the secondary +DC supply and secondary −DC supply) with respect to ground. With the current sense resistor 28 coupled to ground, common mode offset, that may be introduced into the feedback loop of the single-ended linear drive, is minimized.

Figure 3:
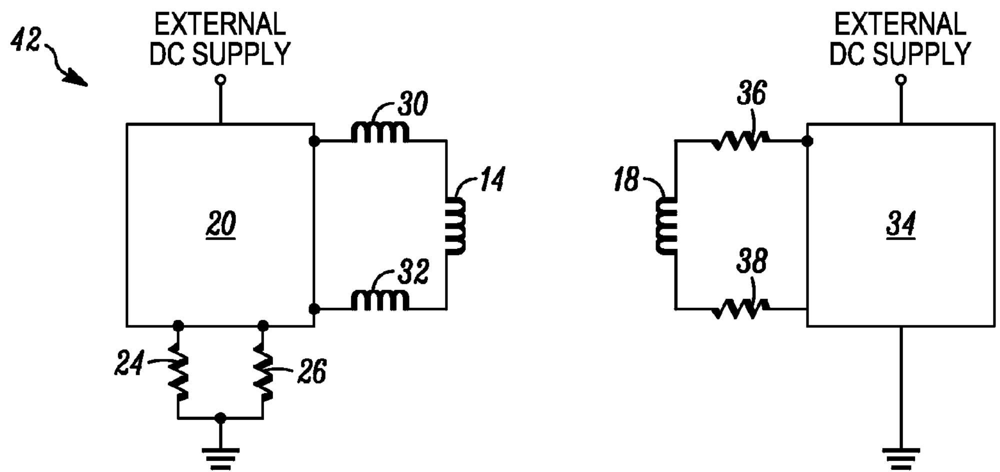
FIG. 3 is a block diagram of a force coil drive system having an H-bridge PWM Drive and an H-bridge linear drive in accordance with another exemplary embodiment of the present invention.

FIG. 3 is a block diagram of a force coil drive system 42 having an H-bridge PWM drive 20 and an H-bridge linear drive 34 in accordance with another exemplary embodiment of the present invention. The linear drive 34 is identified as an H-bridge type by being powered between the external DC supply and ground. The coarse force coil 14 continues to be driven by the H-bridge PWM drive 20, and inductors 30 and 32 are coupled between the coarse force coil 14 and the H-bridge PWM drive 34. Current sense resistors 36 and 38 are also coupled in series with the fine force coil 18. The inductor 30 is coupled between the H-bridge PWM drive 20 and one end of the coarse force coil 14, and the inductor 32 is coupled between the H-bridge PWM drive 20 and the other end of the coarse force coil 14. The inductors 30 and 32 add additional series inductance with the inductance of the coarse force coil 14. In this exemplary embodiment, the inductors 30 and 32 isolate the coarse force coil 14 from the sharp voltage edges of the H-bridge PWM drive 34 which may otherwise result in conducted or radiated noise without such inductors 30 and 32. Additional resistors (not shown) can be added paralleling the inductors 30 and 32 to dampen resonances that might be created by the inductors 30 and 32 and potential stray capacitance across the force coils 14, 18.

Figure 4:
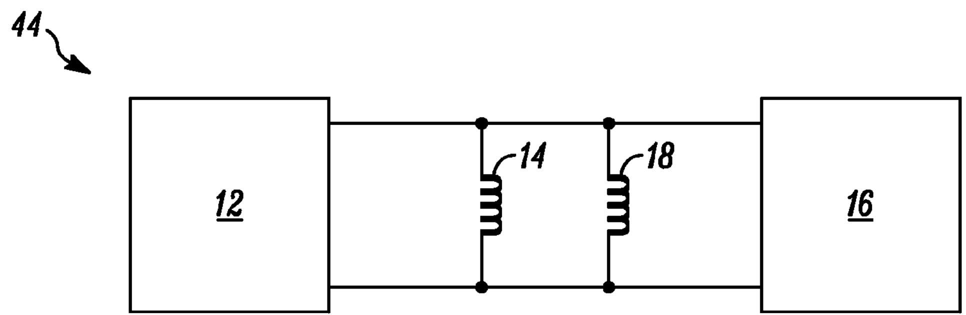
FIG. 4 is a block diagram of a force coil drive system having parallel force coils in accordance with an exemplary embodiment of the present invention.

FIG. 4 is a block diagram of a force coil drive system 44 having parallel force coils 14, 18 in accordance with an exemplary embodiment of the present invention. The drive system 44 comprises the efficient PWM drive 12, the coarse force coil

14, the linear drive 16, and the fine force coil 18. In this exemplary embodiment, the coarse force coil 14 and fine force coil 18 are identical non-magnetically coupled coils that are coupled in parallel. Both the PWM drive 12 and the linear drive 16 drive the parallel coupled force coils 14 and 18. For example, a first end of each of the force coils 14, 18 is coupled to the PWM drive 12 and the linear drive 16, and a second end of each of the force coils 14, 18 is coupled to the PWM drive 12 and the linear drive 16. Both force coils 14 and 18 are used to output a maximum force, and the drive system 44 can be operated to provide a smooth transition as the linear drive 16 operates to carry the PWM drive 12 current thereby increasing efficiency. The force coils 14, 18 are configured to meet both coil operating characteristics and can increase the PWM drive 12 current level.

The drive system 44 operates in Mode-1 (e.g., with only the PWM drive 12 "on") or in Mode-3 (e.g., with only the linear drive 16 "on"), and the drives 12 and 16 are both either H-bridge drives or single-ended drives. The PWM drive 12 can operate in either two-state or three-state. In the event the linear drive 16 is a current source drive, both drives 12 and 16 can be simultaneously operated. The linear drive 16 is preferably activated before the PWM drive 12 is turned "off" when switching from Mode-1 to Mode-3. When the PWM drive 12 is deactivated, all output stages of the PWM drive 12 are turned "off" for operation of the linear drive 16. When the PWM drive 12 is re-activated, the PWM drive 12 is preferably activated before the linear drive 16 is deactivated for minimum transition disturbance. When deactivated, the linear drive 16 has all output stages "off" or produces a zero current command.

Figure 5:
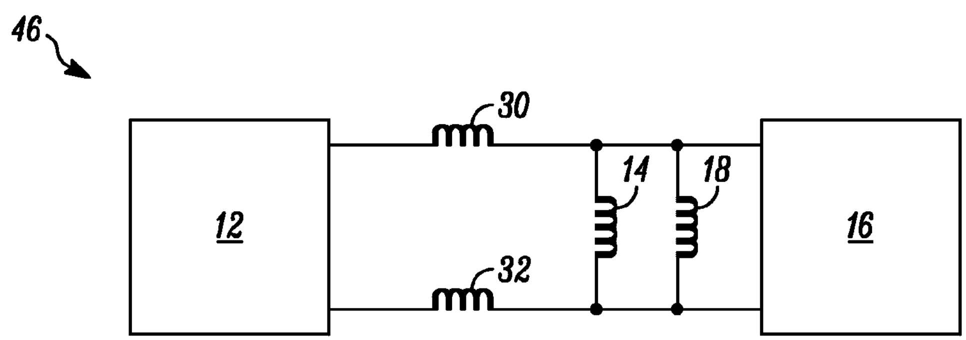
FIG. 5 is a block diagram of a force coil drive system having parallel force coils in accordance with another exemplary embodiment of the present invention.

FIG. 5 is a block diagram of a force coil drive system 46 having parallel force coils 14, 18 in accordance with another exemplary embodiment of the present invention. In this exemplary embodiment, the coarse force oil 14 and fine force coil 18 are coupled in parallel. The PWM Drive 12 is isolated from the parallel coupled force coils 14, 18 by series inductors 30 and 32, and the linear drive 16 is coupled directly across the parallel coupled force coils 14, 18. For example, each of the inductors 30, 32 has one end coupled to the PWM drive 12 and another end coupled to a different end of the parallel coupled force coils 14, 18. In this exemplary embodiment, drive system 46 can operate in Mode-1, Mode-2, or Mode-3 with sufficient inductance provided by inductors 30, 32, and the drives 12 and 16 are both either H-bridge drives or single-ended drives. Both drives drive the parallel coupled force coils 14, 18 and are thus capable of outputting high forces while having the bandwidth for low force applications.

Figure 6:
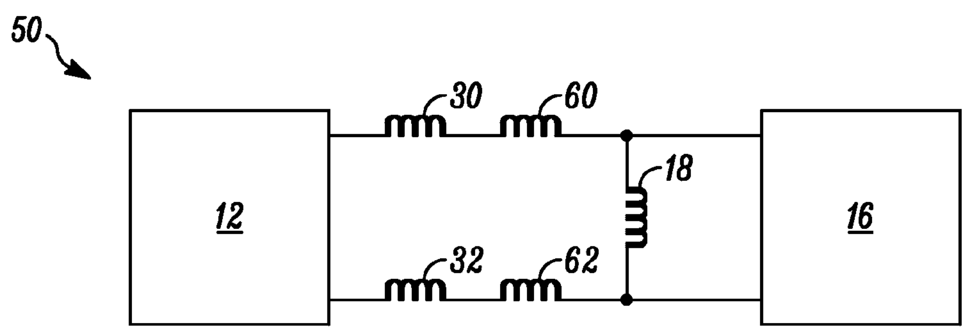
FIG. 6 is a block diagram of a force coil drive system in accordance with an exemplary embodiment of the present invention.

FIG. 6 is a block diagram of a force coil drive system 50 in accordance with another exemplary embodiment of the present invention. In this exemplary embodiment, two force coils 60 and 62 are magnetically coupled to one another, thereby maximizing the total inductance of the force coils 60, 62, and replace the coarse force coil 14 shown in FIG. 5. The fine force coil 18 is magnetically isolated from the coarse force coils 60, 62. Each of the force coils 60, 62 is coupled in series with the fine force coil 18 such that each of the force coils 60, 62 has one end coupled to a different end of the fine force coil 18. The drive system 50 also comprises inductors 30 and 32 that are each coupled to a different one of the force coils 60, 62. For example, a first end of the force coil 60 is coupled to the inductor 30, a second end of the force coil 60 is coupled to a first end of the fine force coil 18, a first end of the force coil 62 is coupled to the inductor 32, and a second end of the force coil 62 is coupled to a second end of the fine force coil 18. The inductors 30, 32 may be omitted from drive system 50.

The PWM drive 12 is coupled to the free ends of the inductors 30, 32, and the linear drive 16 is coupled directly across the fine force coil 18. The coarse force coils 60 and 62 isolate the PWM drive 12 from the linear drive 16. In this exemplary embodiment, the drive system 50 is efficient because all of the coil volume is used to minimize the power loss of the PWM drive 12. Additionally, this exemplary embodiment allows for tuning (e.g., selection of the force coil weight and size) the fine force coil 18 separately from the coarse force coils 60, 62 for bandwidth requirements. The drive system 50 can operate in Mode-1, Mode-2, or Mode-3 with sufficient inductance provided by the coarse force coils 60, 62 and the inductors 30, 32. The drives 12, 16 are both H-bridge drives or single-ended drives. The PWM drive 12 operates in two-state in the event the linear drive 16 is simultaneously operated (e.g., during Mode-3). When the PWM drive 12 is deactivated, all output stages of the PMW drive 12 are "off" to allow the linear drive 16 to operate. When deactivated, the linear drive 16 has all output stages "off" or produces a zero current command. The coil tuning is preferably accomplished by adjusting the ratio of physical dimensions of the coarse force coils 60, 62 and the fine force coil 18 rather than adjusting the wires sizes of the force coils 60, 62, 18.

Figure 7:
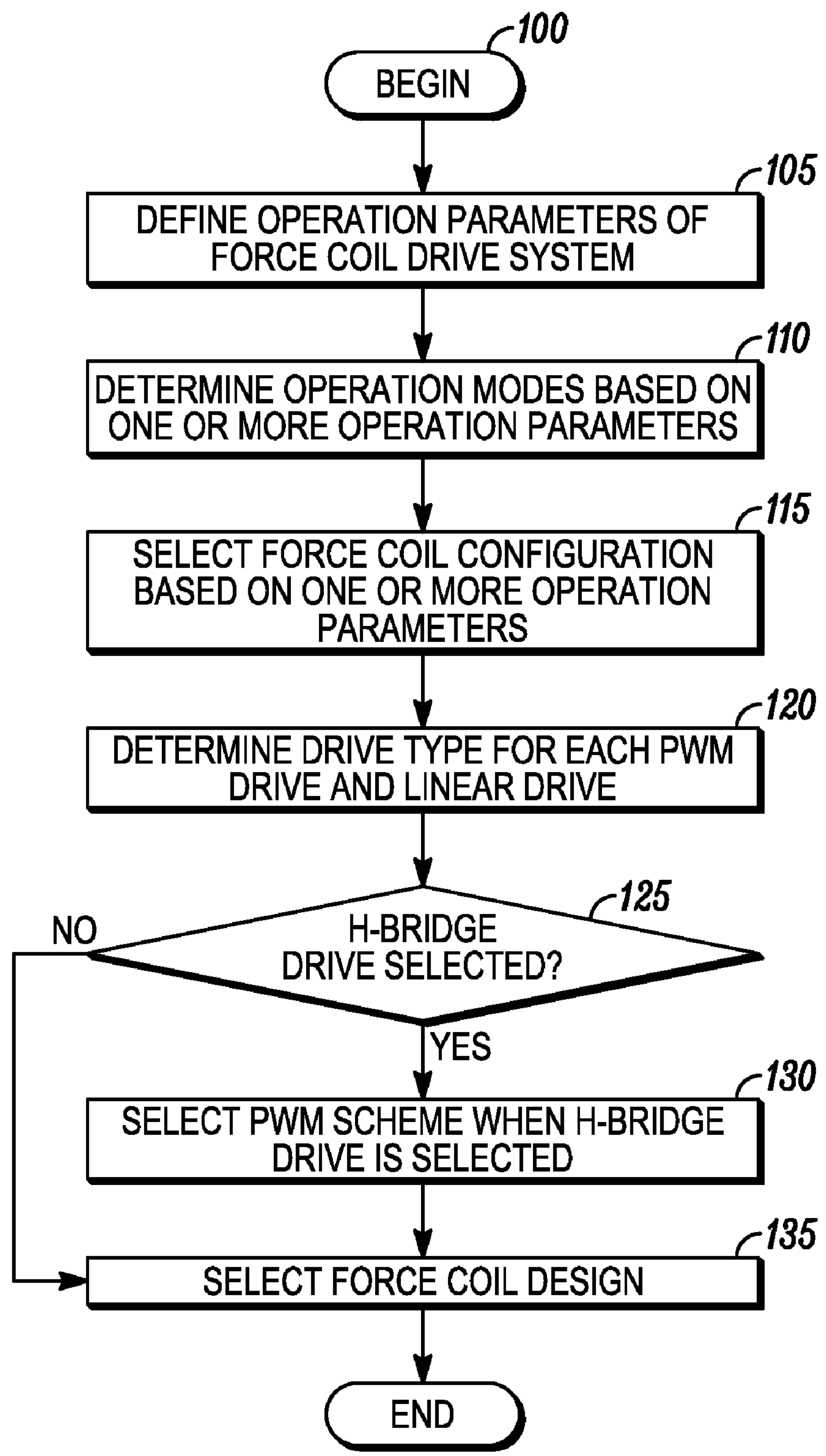
FIG. 7 is a flow diagram of a method for manufacturing a force coil drive system in accordance with an exemplary embodiment of the present invention.

FIG. 7 is a flow diagram of a method 200 for manufacturing a force coil drive system in accordance with an exemplary embodiment of the present invention. The drive system comprises a PWM drive and a linear drive. Operation parameters of the drive system are determined as indicated at step 105. For example, the high force range and corresponding bandwidth requirements are initially determined for a desired drive system efficiency. Additionally, the minimal noise/ripple range of operation for the drive system and the corresponding bandwidth and resolution requirements are determined. Modes of operation of the drive system are established as indicated at step 110. In an exemplary embodiment, the modes of operation are selected from one or more combinations of Mode-1, Mode-2, and Mode-3 (e.g., a first combination of Mode-1 and Mode-2, a second combination of Mode-2 and Mode-3, a third combination of Mode-1 and Mode-3, and a fourth combination of Mode-1, Mode-2, and Mode-3). The operating relationship between the high force range and noise/ripple range may influence the selection of the modes of operation. In some applications, the drive system can separate operation to provide the forces for each of the ranges. In other applications, the drive system is limited to a particular mode of operation. For example, to cancel PWM ripple using the linear drive, the drive system operates in Mode-3. A force coil configuration is selected as indicated at step 115. The force coil configuration may be selected from a parallel coil configuration, a series coil configuration, and an isolated coil configuration. The selected modes of operation may also influence this selection. For example, the parallel coil configurations may be selected for higher efficiency operation, and the series or isolated coil configurations may be selected to accommodate bandwidth requirements. The type of drive for the PWM drive and the linear drive is selected as indicated at step 120. For example, the PWM drive and the linear drive may be selected to be both H-bridge drives, both single-ended drives, or one H-bridge drive and one single-ended drive. A determination is made as to the selection of an H-bridge drive as indicated at step 125. In the event an H-bridge drive is selected, a PWM scheme is selected as indicated at step 130. For example, a two-state PWM scheme or a three-state PWM scheme is selected for the drive system. Additionally, a PWM disabled state condition and a linear drive disabled state condition are determined. For example, the PWM disabled state condition is determined as either having all output stages of the PWM drive being "off" or having the lower output stages of the PWM drive constantly "on" (e.g., during two-state PWM operation). Additionally, the linear drive disabled state condition is determined as either having all output stages of the linear drive being "off" or having the linear drive transmit a zero current command. The force coil design is determined as indicated at step 135. For example, the weight and size of each of the force coils (e.g., coarse force coil and fine force coil) is optimized for a particular coil configuration.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for driving force coils, the system comprising:

a pulse width modulation (PWM) drive having an output coupled to a first coil of the force coils, said PWM drive configured to drive the first coil to apply a first force; and a linear drive having an output coupled to a second coil of the force coils, said linear drive configured to drive the second coil to apply a second force, said first force greater than said second force, said second force having low noise.

2. A system according to claim 1, wherein said PWM drive and said linear drive are together configured to operate in a mode selected from the group consisting of:

a first mode comprising said PWM drive being activated and said linear drive being deactivated;

a second mode comprising said PWM drive and said linear drive both being activated; and a third mode comprising said linear drive being activated and said PWM drive being deactivated.

3. A system according to claim 1, wherein when transitioning from said first mode to said third mode, said linear drive is configured to be activated prior to said PWM drive being deactivated.

4. A system according to claim 1, wherein the first coil has first and second ends; wherein each of said PWM drive and said linear drive comprises an H-bridge drive; and wherein said PWM drive further comprises:

a first operating state, said PWM drive configured to couple the first end of the first coil to a supply potential and coupling the second end of the first coil to a ground during said first operating state;

a second operating state, said PWM drive configured to couple the first and second ends of the first coil to said ground during said second operating state;

a third operating state, said PWM drive configured to couple the first end of the first coil coupled to said ground and couple the second end of the first coil to said supply potential during said first operating state; and wherein said PWM drive is further configured to operate in one of a two-state PWM scheme and a three-state PWM scheme, said PWM drive configured to switch between said first operating state and said third operating state during said two-state PWM scheme, said PWM drive further configured to switch between said first operating state and said second operating state and switch between said second operating state and said third operating state during said three-state PWM scheme.

5. A system for driving force coils, the system comprising:

a first force coil;

a pulse width modulation (PWM) drive having an output coupled to said first force coil, said PWM drive configured to drive said first force coil to apply a first force;

a second force coil; and a linear drive having an output coupled to said second force coil, said linear drive configured to drive said second coil to apply a second force, said first force greater than said second force, said second force having low noise.

6. A system according to claim 5, wherein said PWM drive is further configured to drive said first force coil to apply from about −100 lbf to about +100 lbf; and wherein said linear drive is further configured to drive said second force coil to apply from about −1 lbf to about +1 lbf.

7. A system according to claim 5, wherein said PWM drive is further configured to drive said first force coil with a resolution of about 0.006 lbf, and wherein said linear drive is further configured to drive said second force coil with a resolution of about 0.0001 lbf.

8. A system according to claim 5, wherein said PWM drive comprises an H-bridge PWM drive having a first input configured to couple to a primary direct current (DC) supply and having a second input configured to couple to a reference potential;

wherein said linear drive comprises a single-ended linear drive having first and second inputs, said first input of said single-ended linear drive configured to couple to a + secondary DC supply, said second input of said single-ended linear drive configured to couple to a − secondary DC supply;

wherein said second force coil has first and second ends; and wherein the system further comprises a resistor having a first end coupled to said first end of said second force coil and having a second end coupled to said reference potential, said second end of said second force coil coupled to said output of said linear drive.

9. A system according to claim 5, wherein said PWM drive comprises an H-bridge PWM drive having a first input configured to couple to a DC supply and having a second input configured to couple to a reference potential; and wherein said linear drive comprises an H-bridge linear drive having an input configured to couple to said DC supply and having a second input configured to couple to said reference potential.

10. A system according to claim 9, wherein each of said first and second force coils has first and second ends; and wherein the system further comprises:

a first inductor having a first end coupled to said first end of said first force coil and having a second end coupled to said H-bridge PWM drive;

a second inductor having a first end coupled to said second end of said first force coil and having a second end coupled to said H-bridge PWM drive;

a first resistor having a first end coupled to said first end of said second force coil and having a second end coupled to said H-bridge linear drive; and a second resistor having a first end coupled to said second end of said second force coil and having a second end coupled to said H-bridge linear drive.

11. A system according to claim 5, wherein said PWM drive and said linear drive are selected from the group consisting of both H-bridge drives and both single-ended drives; and wherein said first and second force coils are non-magnetically coupled in parallel.

12. A system according to claim 11, wherein said first and second force coils each have first and second ends; and wherein the system further comprises:

a first inductor having a first end coupled to said PWM drive and having a second end coupled to said first end of said first force coil; and a second inductor having a first end coupled to said PWM drive and having a second end coupled to said second end of said first force coil; and wherein said PWM drive is magnetically isolated from said first and second force coils via said first and second inductors.

13. A system according to claim 5, wherein said first force coil comprises third and fourth force coils, said third force coil magnetically coupled to said fourth force coil, said second force coil magnetically isolated from said third and fourth force coils, each of said second, third, and fourth force coils having first and second ends, said first end of said third force coil coupled to said PWM drive, said second end of said third force coil coupled to said first end of said second force coil, said first end of said fourth force coil coupled to said PWM drive, said second end of said fourth force coil coupled to said second end of said second force coil; and wherein said linear drive is coupled across said second force coil.

14. A system according to claim 5, wherein said first force coil comprises third and fourth force coils, said third force coil magnetically coupled to said fourth force coil, said second force coil magnetically isolated from said third and fourth force coils, each of said second, third, and fourth force coils having first and second ends; and wherein the system further comprises:

a first inductor having a first end coupled to said PWM drive and having a second end coupled to said first end of said third coil, said second end of said third coil coupled to said first end of said second coil; and a second inductor having a first end coupled to said PWM drive and having a second end coupled to said second end of said fourth coil, said second end of said fourth coil coupled to said second end of said second coil.

15. A method for manufacturing a force coil drive system having a pulse width modulation (PWM) drive and a linear drive, the method comprising the steps of:

defining operation parameters of the force coil drive system;

determining modes of operation based on one or more of the operation parameters;

selecting a force coil configuration based on one or more of the operation parameters;

determining a drive type for each of the PWM drive and the linear drive;

selecting a PWM scheme when an H-bridge drive is selected; and selecting a force coil design.

16. A method according to claim 15, wherein said step of defining operation parameters comprises:

defining a high force range and a first bandwidth based on the high force range; and defining a minimal noise range, a second bandwidth based on the minimal noise range, and a resolution based on the minimal noise range.

17. A method according to claim 15, wherein said step of determining modes of operation comprises combining at least two modes from the group comprising:

activating only the PWM drive;

activating the PWM drive and the linear drive together; and activating only the linear drive.

18. A method according to claim 15, wherein said step of selecting a force coil configuration comprises selecting the force coil configuration from a parallel coil configuration, a series coil configuration, and an isolated coil configuration.

19. A method according to claim 15, wherein said step of selecting a PWM scheme comprises selecting the PWM scheme from a two-state PWM and a three-state PWM.

20. A method according to claim 15 further comprising determining a PWM disable state condition and a linear drive disable state condition based on the modes of operation.

* * * * *